Dec. 17, 1935.  E. R. PARSONS  2,024,871
TOGGLE BOLT AND SLEEVE
Filed June 13, 1935
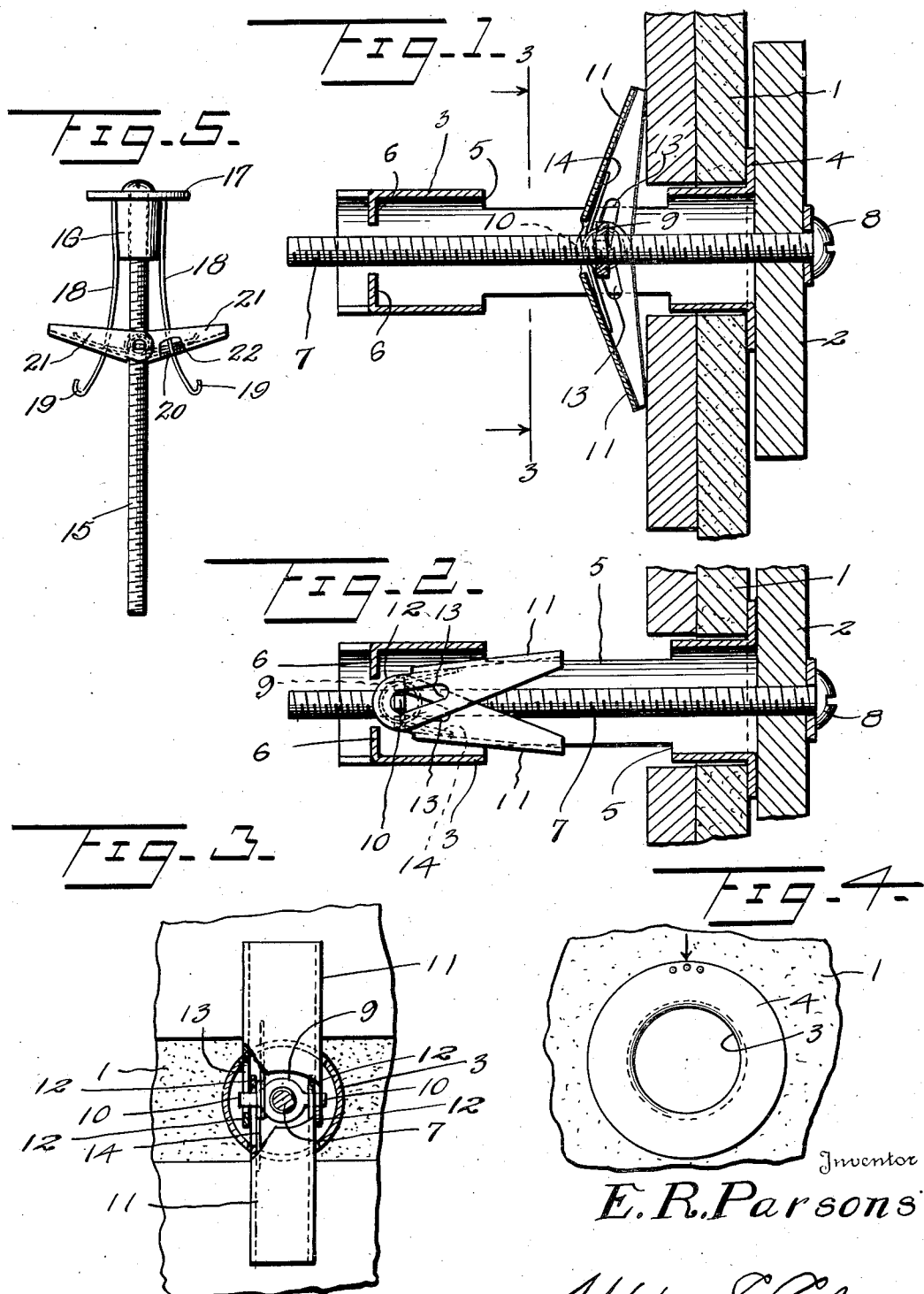
Inventor
E. R. Parsons
By Watson E. Coleman
Attorney Patented Dec. 17, 1935

2,024,871

UNITED STATES PATENT OFFICE 2,024,871

TOGGLE BOLT AND SLEEVE

Edwin R. Parsons, Wheaton, Ill.

Application June 13, 1935, Serial No. 26,432

7 Claims. (Cl. 85—3)

This invention relates to the class of securing devices and pertains particularly to an improved toggle bolt and means for controlling the toggles thereof.

The primary object of the present invention is to provide a novel toggle bolt whereby the insertion of the bolt and toggle into a wall aperture and the tightening up of the bolt for the purpose of holding an article in position on the wall or aganist the wall is facilitated.

Another object of the invention is to provide a toggle bolt and an associate mechanism which is designed to facilitate the ready removal of the bolt and toggle, in addition to facilitating its easy location in a desired position, so that the toggle bolt may be used in other locations.

The invention will be best understood from a consideration of the following detailed description taken in connection with the accompanying drawing forming a part of the specification, with the understanding, however that the invention is not to be confined to the showing of the drawing but may be changed or modified so long as such changes or modifications mark no material departure from the salient features of the invention as expressed in the accompanying claims.

Figure 1 is a longitudinal section through the device embodying the invention showing the same in use.

Figure 2 is a longitudinal section through the device showing the same set for removal.

Figure 3 is a section on the line 3—3 of Figure 1.

Figure 4 is a view of the face of the sleeve flange.

Figure 5 is a view in elevation of a modified form of the invention.

Referring now more particularly to the drawing, wherein like numerals of reference indicate corresponding parts throughout the several views, the numeral 1 indicates a portion of a wall and the numeral 2 indicates an article supported against the wall by the device embodying the present invention and illustrating the manner in which the device operates. The invention includes in one form a sleeve 3, the length of which is controlled by the thickness of the wall through which it is to be extended. It will be obvious, therefore, that the device when supplied commercially will be in various lengths so that the proper selection may be made for the wall thickness involved. The sleeve 3 is provided at one end with a surrounding integral flange or collar 4 and intermediate its tends it has the longitudinally extending opposite openings or slots 5. One of these openings is preferably of slightly greater width than the other, the purpose for which will be hereinafter set forth.

At the opposite end of the sleeve from the collar or flange 4 the sleeve has two portions cut away and turned inwardly to form the tongues 6 which serve to prevent the portion of the device moving through and falling out of the sleeve.

Associated with the sleeve is a relatively long screw 7, which is threaded throughout and which has a head 8 upon one end. This screw has threadably mounted thereon a nut 9 which carries integral diametrically opposite ears 10. Pivotally mounted upon the ears 10 of this nut are the two toggle fingers 11, each of which is substantially channel shaped and at one end terminates in the two side extensions 12, which are in spaced relation and which straddle the screw and nut to receive in the slots 13 therein, the ears 10, previously referred to. These toggle fingers extend in opposite directions from the screw 7 to which they are pivotally attached and are normally forced to swing outwardly or to positions oblique to the screw, by a spring 14 which surrounds one of the ears 10 and has its two ends each bearing against a toggle finger.

In the use of the described form of the device, the wall 1 is provided with an opening of a diameter to snugly receive the sleeve 3. The sleeve is then inserted and when in position with its flange 4 against the face of the wall, the openings 5 will project beyond the rear face of the wall after a sleeve of the proper length has been selected. With the toggle arms mounted upon the screw 7 in the manner illustrated but at or near the end of the screw remote from the head 8, the screw and arms are inserted into the sleeve and the arms forced inwardly until they reach the openings 5 whereupon the spring 14 will effect the projection of the toggle fingers outwardly through the openings and by then rotating the screw in the proper direction, the head thereof and the toggle fingers will be caused to move together so as to draw into position against the face of the wall, any object through which the screw may have been passed. It will, of course, be apparent that since the toggle fingers are in the form of the channeled bodies and one thereof straddles the other where they are connected with the nut 9, one of the bodies must be of greater width than the other. The openings 5 are therefore, made to accommodate these two fingers, one opening being slightly larger than the other so that the fingers will lie snugly therein. It is necessary, therefore, that the user of the device know how to insert the toggle fingers so that the wider one will be properly located to enter the wider slot or opening 5 and to this end there is made an identifying mark or some suitable character upon the face of the flange 4 in alinement with the opening 5 of greatest width so that the user of the device will know to adjust the toggle fingers with the wider one beneath this marking.

When the fingers are forced in they will then be in the proper position to enter their respective openings. In effecting the removal of the screw and toggle fingers so that the same, with the sleeve, may be used again in another location, the screw is backed out of the sleeve so that the head moves away from the adjacent wall and after the same has been moved out a sufficient distance, it is forced inwardly so as to carry the toggle fingers with it and cause the same to be forced into the sleeve beyond the openings 5 and thus folded down against the screw 7 and against the tension of the spring 14. The ends of the fingers will then be within the circular area defined by the overall circumference of the sleeve and the entire device may be slipped out of the opening in the wall in which the sleeve was set.

It will be apparent that the inturned tongues 6 at the inner end of the sleeve operate to prevent the pushing of the fingers too far to the rear when manipulating the device to remove it from the wall.

Figure 5 illustrates a modified form of the invention wherein the bolt 15 extends through a short sleeve 16 which is provided on one end with a collar 17. This sleeve 16 is designed to position in the wall opening like the sleeve 3 with the flange 17 against the outer face of the wall and the bolt 15 passes through the body 1, to be secured to the wall and has its head contacting the body or acting to force the body in against the sleeve collar.

The sleeve 16 is provided with the two relatively long and normally arcuate spring arms 18 which are joined to the sleeve at opposite sides and extend longitudinally thereof and normally curve outwardly therefrom so that the free ends which are turned back to form hooks 19 are in divergent relation. Each of these spring arms 18, passes through an aperture 20 in a toggle arm 21 and each of these toggle arms is mounted for oscillation upon a nut, like the arms 11, and are normally urged to swing to the outwardly extending positions in which they are shown in Figure 5 by a spring 22, like the spring 14 which controls the arms 11.

From the foregoing, together with the illustration of the modified form, it is believed to be apparent that by threading the carrying nut for the arms 21 toward the end of the bolt 15 opposite the headed end and then forcibly drawing the sleeve 16 toward the head, the spring arms 18 will be drawn through the toggle arms 21 to the point where the hooks 19 will engage the toggle arms and cause the latter to be swung into closed position relative to the bolt like the arms 11 are illustrated relative to the bolt 7 in Figure 2. The bolt with the toggle arms may then be inserted into or removed from a wall opening as desired.

I claim:—

1. In a device of the character described, a screw, a pair of toggle fingers coupled with said screw for oscillatory movement relative thereto and for movement longitudinally thereof, spring means normally urging said fingers to swing into planes extending transversely of the screw, the said fingers being adapted for extension through a wall aperture to the rear face of the wall, and means movable independently of the screw facilitating the movement of the fingers against said spring means and their retraction through said wall aperture.

2. In a device of the character described, a screw, toggle arms pivotally coupled together on said screw and adapted for movement longitudinally of the same, resilient means normally urging the arms to swing into oblique relation with the screw, the arms being designed for extension through a wall aperture on the screw to the rear face of the wall, and sleeve means free of connection with and encircling the screw and having wall openings through which the said fingers may extend.

3. The combination with a threaded bolt having a pair of toggle fingers threadably and pivotally attached at one end thereto, of a sleeve through which said toggle fingers and an end of said bolt are adapted to extend, the said sleeve being freely movable relative to and free of connection with the bolt and having opposite slots in the wall thereof for the extension of said toggle fingers beyond the wall of the sleeve and means normally urging the other ends of the fingers in a direction to project through said slots.

4. The combination with a threaded bolt having a pair of toggle fingers threadably and pivotally attached at one end thereto, of a sleeve through which said toggle fingers and an end of said bolt are adapted to extend, the sleeve being free of connection with the bolt for free longitudinal movement relative thereto, the said sleeve having opposite slots in the wall thereof for the extension of the other ends of said toggle fingers beyond the wall of the sleeve, the said slots of the sleeve terminating a substantial distance short of that end toward which the fingers are moved in inserting the same into the sleeve, whereby the fingers may be forced against the end edges of the slots to facilitate the folding of the fingers into the area defined by the sleeve.

5. In a device of the character described, a headed screw member, a pair of pivotally coupled arms, means threadably connecting the arms with the screw to facilitate movement of the arms longitudinally thereof, and means adapted for movement relative to the screw for effecting concerted oscillation of said arms into positions in close proximity to and longitudinally of the screw.

6. In a device of the character described, a headed screw, a pair of pivotally coupled arms, means in threaded connection with said screw for effecting the movement of the arms longitudinally of the screw, a sleeve surrounding the screw and freely slidable thereon without turning, resilient means normally urging the upper ends of the arms outwardly from the screw, and means for effecting the swinging of the arms together upon movement of the sleeve longitudinally of the screw.

7. In a device of the character described, a headed screw, a pair of pivotally coupled arms, means in threaded connection with said screw for effecting the movement of the arms longitudinally of the screw, a sleeve surrounding the screw, resilient means normally urging the upper ends of the arms outwardly from the screw, and a pair of resilient spring arms each connected at one end with said sleeve and extending longitudinally of the screw and through an aperture in one of said first arms, each of said spring arms having a hook upon its free end for engagement with the first mentioned arms to facilitate the swinging of the latter relative to the screw upon movement of the sleeve longitudinally of the screw.

EDWIN R. PARSONS.